United States Patent
Lin et al.

(10) Patent No.: US 11,508,331 B1
(45) Date of Patent: Nov. 22, 2022

(54) IMAGE UNIFORMITY COMPENSATION DEVICE

(71) Applicant: Novatek Microelectronics Corp., Hsinchu (TW)

(72) Inventors: Wen-Chi Lin, Yilan County (TW); Chin-Chu Wu, Taichung (TW); Chung-Wen Hung, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/243,555

(22) Filed: Apr. 28, 2021

(51) Int. Cl.
*G09G 5/02* (2006.01)
*G09G 5/06* (2006.01)
*G09G 5/10* (2006.01)
*G09G 3/20* (2006.01)
*G09G 3/32* (2016.01)
(Continued)

(52) U.S. Cl.
CPC ............. *G09G 5/06* (2013.01); *G06T 5/50* (2013.01); *G09G 5/04* (2013.01); *G09G 5/10* (2013.01); *G09G 2320/0233* (2013.01); *G09G 2320/0242* (2013.01); *G09G 2340/06* (2013.01)

(58) Field of Classification Search
CPC .. G09G 5/02; G09G 5/06; G09G 5/10; G09G 5/04; G09G 3/2003; G09G 3/3225; G09G 2320/0233; G09G 2320/0242; G09G 2340/06; G09G 3/2007; G06T 5/50; G06T 11/001; G06K 9/00; G06K 9/96298; H04N 1/60; H04N 1/6002; H04N 1/6005; H04N 1/6019; H04N 1/6025; H04N 1/6041; H04N 5/57; H04N 5/72; H04N 5/147; H04N 5/202; H04N 5/21; H04N 5/213; H04N 5/35509; H04N 5/537; H04N 5/3651; H04N 9/64; H04N 9/77; H04N 11/20; H04N 11/24; H04N 13/125; H04N 13/139; H04N 13/144; H04N 19/00; H04N 19/142; H04N 19/85
See application file for complete search history.

(56) References Cited

U.S. PATENT DOCUMENTS

2003/0142357 A1* 7/2003 Gindele ................. H04N 1/407
358/3.27
2005/0169551 A1* 8/2005 Messing .............. G09G 3/2003
382/260

(Continued)

*Primary Examiner* — Wesner Sajous
(74) *Attorney, Agent, or Firm* — JCIPRNET

(57) ABSTRACT

The disclosure provides an image uniformity compensation device. The image uniformity compensation device includes a local pre-compensation circuit, a chromaticity uniformity compensation circuit, a local post-compensation circuit, and a luminance uniformity correction circuit. A local pre-conversion performed by the local pre-compensation circuit includes the following. An image frame is divided into multiple regions, and each of the regions is converted from an optical non-linear domain to an optical linear domain to generate a corresponding region in multiple regions of a converted frame. A local post-conversion performed by the local post-compensation circuit includes the following. An image frame is divided into multiple regions, and each of the regions is converted from the optical linear domain to the optical non-linear domain to generate a corresponding region in multiple regions of a converted frame.

28 Claims, 3 Drawing Sheets

(51) Int. Cl.
  *G09G 5/04* (2006.01)
  *G06T 11/00* (2006.01)
  *G06T 5/50* (2006.01)
  *H04N 1/60* (2006.01)
  *H04N 5/365* (2011.01)
  *H04N 9/64* (2006.01)
  *H04N 19/85* (2014.01)

(56) References Cited

U.S. PATENT DOCUMENTS

| | | | |
|---|---|---|---|
| 2012/0218442 A1* | 8/2012 | Jandhyala | G06T 7/20 |
| | | | 348/E5.051 |
| 2016/0125580 A1* | 5/2016 | He | H04N 9/68 |
| | | | 345/590 |
| 2018/0082631 A1* | 3/2018 | Chang | G09G 3/3225 |
| 2021/0152801 A1* | 5/2021 | Wang | H04N 7/0135 |

* cited by examiner

IMAGE UNIFORMITY COMPENSATION DEVICE

BACKGROUND

Technical Field

The disclosure relates to an image device, and in particular to an image uniformity compensation device.

Description of Related Art

Image uniformity (for example, luminance uniformity and chromaticity uniformity) is important in a flat panel display. For example, if the luminance around an image of the display is different from that in the middle of the image, the visual experience of a viewer will be affected. The larger a display panel, the worse the uniformity thereof will be. Improving the image uniformity of a display is an important issue in the field.

SUMMARY

The disclosure provides an image uniformity compensation device to improve image uniformity.

In an embodiment of the disclosure, the image uniformity compensation device includes a local pre-compensation circuit, a chromaticity uniformity compensation circuit, a local post-compensation circuit, and a luminance uniformity correction circuit. The local pre-compensation circuit is configured to perform a local pre-conversion on an original image frame to generate a first converted frame. The local pre-conversion includes the following. The original image frame is divided into multiple regions, and each of the regions of the original image frame is converted from an optical non-linear domain to an optical linear domain to generate a corresponding region in multiple regions of the first converted frame. An input terminal of the chromaticity uniformity compensation circuit is coupled to an output terminal of the local pre-compensation circuit to receive the first converted frame. The chromaticity uniformity compensation circuit is configured to perform a chromaticity uniformity compensation on the first converted frame to generate a first compensated frame. The input terminal of the local post-compensation circuit is coupled to an output terminal of the chromaticity uniformity compensation circuit to receive the first compensated frame. The local post-compensation circuit is configured to perform a local post-conversion on the first compensated frame to generate a second converted frame. The local post-conversion includes the following. The first compensated frame is divided into multiple regions, and each of the regions of the first compensated frame is converted from the optical linear domain to the optical non-linear domain to generate a corresponding region in multiple regions of the second converted frame. An input terminal of the luminance uniformity correction circuit is coupled to an output terminal of the local post-compensation circuit to receive the second converted frame. The luminance uniformity correction circuit is configured to perform a luminance uniformity correction on the second converted frame to generate corrected frame.

In another embodiment of the disclosure, the image uniformity compensation device includes a local pre-compensation circuit, a chromaticity uniformity compensation circuit, a luminance uniformity correction circuit, and a local post-compensation circuit. The local pre-compensation circuit is configured to perform a local pre-conversion on an original image frame to generate a first converted frame. The local pre-conversion includes the following. The original image frame is divided into multiple regions, and each of the regions of the original image frame is converted from an optical non-linear domain to an optical linear domain to generate a corresponding region in multiple regions of the first converted frame. An input terminal of the chromaticity uniformity compensation circuit is coupled to an output terminal of the local pre-compensation circuit to receive the first converted frame. The chromaticity uniformity compensation circuit is configured to perform a chromaticity uniformity compensation on the first converted frame to generate a first compensated frame. An input terminal of the luminance uniformity correction circuit is coupled to an output terminal of the chromaticity uniformity compensation circuit to receive the first compensated frame. The luminance uniformity correction circuit is configured to perform a luminance uniformity correction on the first compensated frame to generate a corrected frame. An input terminal of the local post-compensation circuit is coupled to an output terminal of the luminance uniformity correction circuit to receive the corrected frame. The local post-compensation circuit is configured to perform a local post-conversion on the corrected frame to generate a second converted frame. The local post-conversion includes the following. The corrected frame is divided into multiple regions, and each of the regions of the corrected frame is converted from the optical linear domain to the optical non-linear domain to generate a corresponding region in multiple regions of the second converted frame.

In yet another embodiment of the disclosure, the image uniformity compensation device includes a local pre-compensation circuit, a chromaticity uniformity compensation circuit, a first multiplex circuit, a local post-compensation circuit, a second multiplex circuit, a luminance uniformity correction circuit, and a third multiplex circuit. The local pre-compensation circuit is configured to perform a local pre-conversion on an original image frame to generate a first converted frame. The local pre-conversion includes the following. The original image frame is divided into multiple regions, and each of the regions of the original image frame is converted from an optical non-linear domain to an optical linear domain to generate a corresponding region in multiple regions of the first converted frame. An input terminal of the chromaticity uniformity compensation circuit is coupled to an output terminal of the local pre-compensation circuit to receive the first converted frame. The chromaticity uniformity compensation circuit is configured to perform a chromaticity uniformity compensation on the first converted frame to generate a first compensated frame. A first input terminal of the first multiplex circuit is coupled to an output terminal of the chromaticity uniformity compensation circuit to receive the first compensated frame. An input terminal of the local post-compensation circuit is coupled to an output terminal of the first multiplex circuit to receive a first output frame. The local post-compensation circuit is configured to perform a local post-conversion on the first output frame of the first multiplex circuit to generate a second converted frame. The local post-conversion includes the following. the first output frame is divided into multiple regions, and each of the regions of the first output frame is converted from the optical linear domain to the optical non-linear domain to generate a corresponding region in multiple regions of the second converted frame. A first input terminal of the second multiplex circuit is coupled to an output terminal of the local post-compensation circuit to receive the second converted frame. A second input terminal of the second multiplex circuit is coupled to the output terminal of the chromaticity uniformity compensation circuit to receive the first compensated frame. An input terminal of the luminance uniformity correction circuit is coupled to an output terminal of the second multiplex circuit to receive a second output frame. The luminance uniformity correction circuit is configured to perform a luminance uniformity correction on the second output frame to generate a corrected frame. An output terminal of the luminance uniformity correction circuit is coupled to a second input terminal of the first multiplex circuit. A first input terminal of the third multiplex circuit is coupled to the output terminal of the luminance uniformity correction circuit to receive the corrected frame. A second input terminal of the third multiplex circuit is coupled to an output terminal of the local post-compensation circuit to receive the second converted frame.

Based on the above, the image uniformity compensation device according to the embodiments of the disclosure may convert a data domain of chromaticity uniformity processing (algorithm) of a chromaticity uniformity compensation circuit to a more accurate optical linear domain (for example, a linear RGB domain) through converting and correcting the local pre-compensation circuit and the local post-compensation circuit Therefore, the chromaticity uniformity processing of the chromaticity uniformity compensation circuit may achieve a more accurate chromaticity uniformity correction to improve image uniformity.

Embodiments accompanied with figures are described in detail below to further describe the features of the disclosure as described above in details.

DESCRIPTION OF THE EMBODIMENTS

Figure 1:
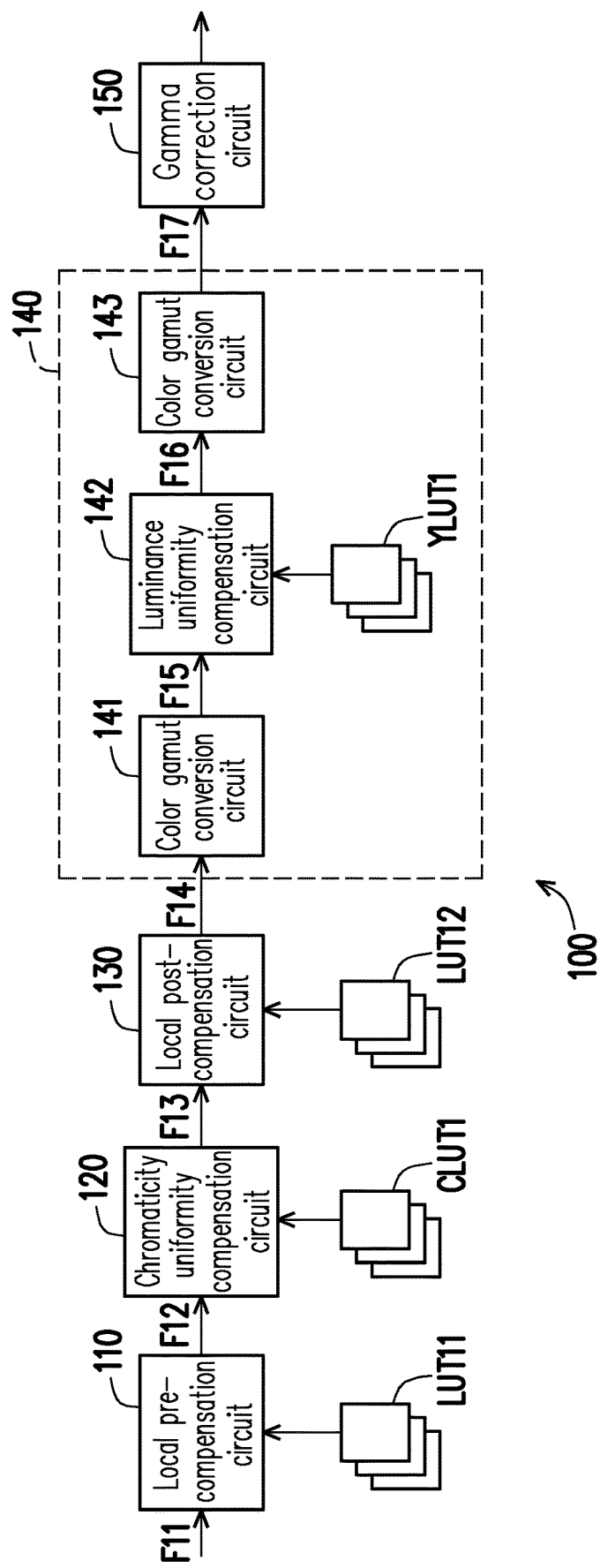
FIG. 1 is a schematic diagram of a circuit block of an image uniformity compensation device according to an embodiment of the disclosure.

The term "coupled" (or "connected") used in the full text of the specification of this application (including the claims) may refer to any direct or indirect connection methods. For example, if the text describes that a first device is coupled (or connected) to a second device, it should be interpreted as that the first device may be directly connected to the second device, or the first device may be indirectly connected to the second device through other devices or connection methods. The terms "first" and "second" mentioned in the full text of the specification of this application (including the claims) are used to name the elements, or to distinguish between different embodiments or ranges, and are not intended to be used to set an upper or lower limit to the number of the elements, or to limit the order of the elements. In addition, wherever possible, elements/components/steps with the same reference numeral in the drawings and embodiments represent the same or similar parts. An element/component/step can be related to for descriptions of elements/components/steps with the same reference numeral or the same term in other embodiments.

FIG. 1 is a schematic diagram of a circuit block of an image uniformity compensation device 100 according to an embodiment of the disclosure. The image uniformity compensation device 100 includes a local pre-compensation circuit 110, a chromaticity uniformity compensation circuit 120, a local post-compensation circuit 130, and a luminance uniformity correction circuit 140. The local pre-compensation circuit 110 may perform a local pre-conversion on an original image frame Flt to generate a converted frame F12. The local pre-conversion includes the following. The original image frame F11 is divided into multiple regions, and each of the regions of the original image frame F11 is converted from an optical non-linear domain to an optical linear domain to generate a corresponding region in multiple regions of the converted frame F12.

For example, the local pre-compensation circuit 110 may divide one original image frame F11 into M*N regions, and M and N are integers according to the actual design. The local pre-compensation circuit 110 includes multiple pre-conversion lookup tables LUT11. Each of the M*N regions of the original image frame F11 has its own pre-conversion lookup table LUT11; that is, the number of the pre-conversion lookup tables LUT11 is M*N. In the embodiments where a red sub-pixel, a green sub-pixel and a blue sub-pixel use different pre-conversion lookup tables LUT11, the number of the pre-conversion lookup tables LUT11 is 3*M*N. The local pre-compensation circuit 110 may select a corresponding pre-conversion lookup table corresponding to a current region in the M*N regions of the original image frame F11 from the pre-conversion lookup tables LUT11. The local pre-compensation circuit 110 may convert the current region from the optical non-linear domain to the optical linear domain by using the corresponding pre-conversion lookup table LUT11. Content of the pre-conversion lookup tables LUT11 may be determined according to the actual design.

The local pre-compensation circuit 110 may convert the current region from the optical non-linear domain to the optical linear domain by performing any algorithm. For example, the local pre-compensation circuit 110 may convert the current region from an optical non-linear domain to an optical linear domain by using the corresponding pre-conversion lookup table LUT11 by performing a conventional algorithm or other algorithms. The local pre-compensation circuit 110 may compensate for the difference between the pixel data and the actual optical properties of the original image frame F11.

An input terminal of the chromaticity uniformity compensation circuit 120 is coupled to an output terminal of the local pre-compensation circuit 110 to receive the converted frame F12. The chromaticity uniformity compensation circuit 120 may perform a chromaticity uniformity compensation on the converted frame F12 to generate a compensated frame F13. In this embodiment (other embodiments are not limited thereto), the chromaticity uniformity compensation circuit 120 may perform a local chromaticity uniformity compensation. For example, the chromaticity uniformity compensation circuit 120 may divide one converted frame F12 into M*N regions, and M and N are integers according to the actual design. The chromaticity uniformity compensation circuit 120 includes multiple chromaticity lookup tables CLUT1. Each of the M*N regions of the converted frame F12 has its own chromaticity lookup table CLUT1; that is, the number of the chromaticity lookup tables CLUT1 is M*N. In the embodiments where a red sub-pixel, a green sub-pixel, and a blue sub-pixel use different chromaticity lookup tables CLUT1, the number of the chromaticity lookup tables CLUT1 is 3*M*N. The chromaticity uniformity compensation circuit 120 may select a corresponding chromaticity lookup table CLUT1 corresponding to a current region in the M*N regions of the converted frame F12 from the chromaticity lookup tables CLUT1. The chromaticity uniformity compensation circuit 120 may generate a corresponding region in multiple regions of the compensated frame F13 by using the corresponding chromaticity lookup table CLUT1 to compensate for the chromaticity uniformity of a current region of the converted frame F12. Therefore, the chromaticity uniformity compensation circuit 120 may compensate for the chromaticity uniformity of the converted frame F12 to generate the compensated frame F13 by using the chromaticity lookup tables CLUT1.

The chromaticity uniformity compensation circuit 120 may compensate for the chromaticity uniformity of the converted frame F12 by performing any algorithm. For example, the chromaticity uniformity compensation circuit 120 may compensate for the chromaticity uniformity of the converted frame F12 by using the chromaticity lookup tables CLUT1 by performing a conventional algorithm or other algorithms. Alternatively, the chromaticity uniformity compensation circuit 120 may compensate for the chromaticity uniformity of each of the regions of the converted frame F12 by performing the following calculation equation 1. In calculation equation 1, R', G', and B' respectively represent red sub-pixel data, green sub-pixel data, and blue sub-pixel data of a current pixel in a current region of the compensated frame F13, A0, A1, A2, B0, B1, B2, C0, C1, and C2 represent the elements in a chromaticity uniformity compensation matrix, R, G and B respectively represent red sub-pixel data, green sub-pixel data, and blue sub-pixel data of a current pixel in the current region of the converted frame F12, and OSR, OSG, and OSB represent elements in an offset matrix. The chromaticity uniformity compensation circuit 120 may obtain the chromaticity uniformity compensation matrix and the offset matrix from one corresponding chromaticity lookup table in the chromaticity lookup tables CLUT1. Content of the chromaticity lookup tables CLUT1 may be determined according to the actual design.

$$\begin{bmatrix} R' \\ G' \\ B' \end{bmatrix} = \begin{bmatrix} A0 & B0 & C0 \\ A1 & B1 & C1 \\ A2 & B2 & C2 \end{bmatrix} * \begin{bmatrix} R \\ G \\ B \end{bmatrix} + \begin{bmatrix} OSR \\ OSG \\ OSB \end{bmatrix} \quad \text{Calculation equation 1}$$

An input terminal of the local post-compensation circuit 130 is coupled to an output terminal of the chromaticity uniformity compensation circuit 120 to receive the compensated frame F13. The local post-compensation circuit 130 may perform a local post-conversion on the compensated frame F13 to generate a converted frame F14. The local post-conversion includes the following. The compensated frame F13 is divided into multiple regions, and each of the regions of the compensated frame F13 is converted from the optical linear domain to the optical non-linear domain to generate a corresponding region in multiple regions of converted frame F14.

For example, the local post-compensation circuit 130 may divide one compensated frame F13 into M*N regions, and M and N are integers according to the actual design. The local post-compensation circuit 130 includes multiple post-conversion lookup tables LUT12. Each of the M*N regions of the compensated frame F13 has its own post-conversion lookup table LUT12; that is, the number of the post-conversion lookup tables LUT12 is M*N. In the embodiments where a red sub-pixel, a green sub-pixel, and a blue sub-pixel use different post-conversion lookup tables LUT12, the number of the post-conversion lookup tables LUT12 is 3*M*N. The local post-compensation circuit 130 may select a corresponding post-conversion lookup table corresponding to the M*N regions of the compensated frame F13 from the post-conversion lookup tables LUT12. The local post-compensation circuit 130 may convert the current region from the optical linear domain to the optical non-linear domain by using the corresponding post-conversion lookup table LUT12. The content of the post-conversion lookup tables LUT12 may be determined according to the actual design.

The local post-compensation circuit 130 may convert the current region from the optical linear domain to the optical non-linear domain by performing any algorithm. For example, the local post-compensation circuit 130 may convert the current region from the optical linear domain to the optical non-linear domain by using the corresponding post-conversion lookup table LUT12 by performing a conventional algorithm or other algorithms. The local post-compensation circuit 130 may compensate for the difference between the pixel data and the actual optical properties of the frame F13.

An input terminal of the luminance uniformity correction circuit 140 is coupled to an output terminal of the local post-compensation circuit 130 to receive the converted frame F14. The luminance uniformity correction circuit 140 may perform a luminance uniformity correction on the converted frame F14 to generate a corrected frame F17 to be provided to a next level circuit (for example, a Gamma correction circuit 150 shown in FIG. 1 or other circuits). In this embodiment (other embodiments are not limited thereto), the luminance uniformity correction circuit 140 may perform a local luminance uniformity compensation.

For example, the luminance uniformity correction circuit 140 may divide one converted frame F14 into M*N regions, and M and N are integers according to the actual design. The luminance uniformity correction circuit 140 includes multiple luminance lookup tables YLUT1. Each of the M*N regions of the converted frame F14 has its own luminance lookup table YLUT1; that is, the number of the luminance lookup tables YLUT1 is M*N. In the embodiment where a red sub-pixel, a green sub-pixel, and a blue sub-pixel use different luminance lookup tables YLUT1, the number of the luminance lookup tables YLUT1 is 3*M*N. The luminance uniformity correction circuit 140 may select a corresponding luminance lookup table YLUT1 corresponding to a current region in the M*N regions of the converted frame F14 from the luminance lookup tables YLUT1. The luminance uniformity correction circuit 140 may perform a luminance uniformity compensation for the current region to generate a corresponding region in multiple regions of the corrected frame F17 by using the corresponding luminance lookup table YLUT1. Therefore, the luminance uniformity correction circuit 140 may compensate for the luminance uniformity of the converted frame F14 to generate the corrected frame F17 by using the luminance lookup tables YLUT1.

The embodiment does not limit the implementation details of the luminance uniformity correction performed by the luminance uniformity correction circuit 140. For example, in the embodiment shown in FIG. 1, the luminance uniformity correction performed by the circuit 140 includes the following. A first color space conversion is performed on the converted frame F14 to generate a converted frame F15, a luminance uniformity compensation is performed on the converted frame F15 to generate a compensated frame F16, and a second color space conversion is performed on the compensated frame F16 to generate the corrected frame F17.

For example, the luminance uniformity correction circuit 140 shown in FIG. 1 may include a color space conversion circuit 141, a luminance uniformity compensation circuit 142, and a color space conversion circuit 143. An input terminal of the color space conversion circuit 141 is coupled to the input terminal of the luminance uniformity correction circuit 140, that is, coupled to the output terminal of the local post-compensation circuit 130, to receive the converted frame F14. The color space conversion circuit 141 may perform the first color space conversion on the converted frame F14 to generate the converted frame F15. The color space conversion circuit 141 may convert the converted frame F14 from a first color space to a second color space by performing any algorithm. For example, the color space conversion circuit 141 may convert the converted frame F14 from the first color space to the second color space by performing a conventional algorithm or other algorithms. That is, the converted frame F14 belongs to the first color space, and the converted frame F15 belongs to the second color space. According to the actual design, in some embodiments, the first color gamut may be a red-green-blue color space (an RGB color space) or other color space, and the second color space may be a luminance chromaticity color space (for example, a YCbCr color space) or other color space.

An input terminal of the luminance uniformity compensation circuit 142 is coupled to an output terminal of the color space conversion circuit 141 to receive the converted frame F15. The luminance uniformity compensation circuit 142 may perform a luminance uniformity compensation on the converted frame F15 to generate the compensated frame F16. In some embodiments, the luminance uniformity compensation circuit 142 may perform a local luminance uniformity compensation on the converted frame F15 to generate the compensated frame F16.

For example, the luminance uniformity compensation circuit 142 may divide one converted frame F15 into M*N regions, and M and N are integers according to the actual design. The luminance uniformity compensation circuit 142 includes multiple luminance lookup tables YLUT1. Each of the M*N regions of the converted frame F15 has its own luminance lookup table YLUT1; that is, the number of the luminance lookup tables YLUT1 is M*N. The luminance uniformity compensation circuit 142 may select a corresponding luminance lookup table corresponding to a current region in the M*N regions of the converted frame F15 from the luminance lookup tables YLUT1. The luminance uniformity compensation circuit 142 may compensate for (or correct) the luminance uniformity of the current region of the converted frame F15 to generate a corresponding region in multiple regions of the compensated frame F16 by using the corresponding luminance lookup table YLUT1. Therefore, the luminance uniformity compensation circuit 142 may compensate for the luminance uniformity of the converted frame F15 to generate the compensated frame F16 by using the luminance lookup tables YLUT1.

When the converted frame F15 belongs to the YCbCr color space, the luminance uniformity compensation circuit 142 may perform a luminance uniformity compensation M on a luminance component (a Y component) of the converted frame F15. For example, the luminance uniformity compensation circuit 142 may multiply the Y component of the converted frame F15 by a luminance uniformity compensation value of the corresponding luminance lookup table YLUT1. Content of the luminance lookup tables YLUT1 may be determined according to the actual design. The luminance uniformity compensation circuit 142 does not change a chromaticity component (for example, a Cb component and a Cr component) of the converted frame F15.

An input terminal of the color space conversion circuit 143 is coupled to an output terminal of the luminance uniformity compensation circuit 142 to receive the compensated frame F16. The color space conversion circuit 143 may perform the second color space conversion on the compensated frame F16 to generate the corrected frame F17. The color space conversion circuit 143 may convert the compensated frame F16 from the second color space to the first color space by performing any algorithm. For example, the color space conversion circuit 143 may convert the compensated frame F16 from the second color space to the first color space by performing a conventional algorithm or other algorithms. That is, the compensated frame F16 belongs to the second color space, and the corrected frame F17 belongs to the first color space. According to actual design, in some embodiments, the first color space may be the RGB color space or other color space, and the second color space may be the YCbCr color space or other color space.

Figure 2:
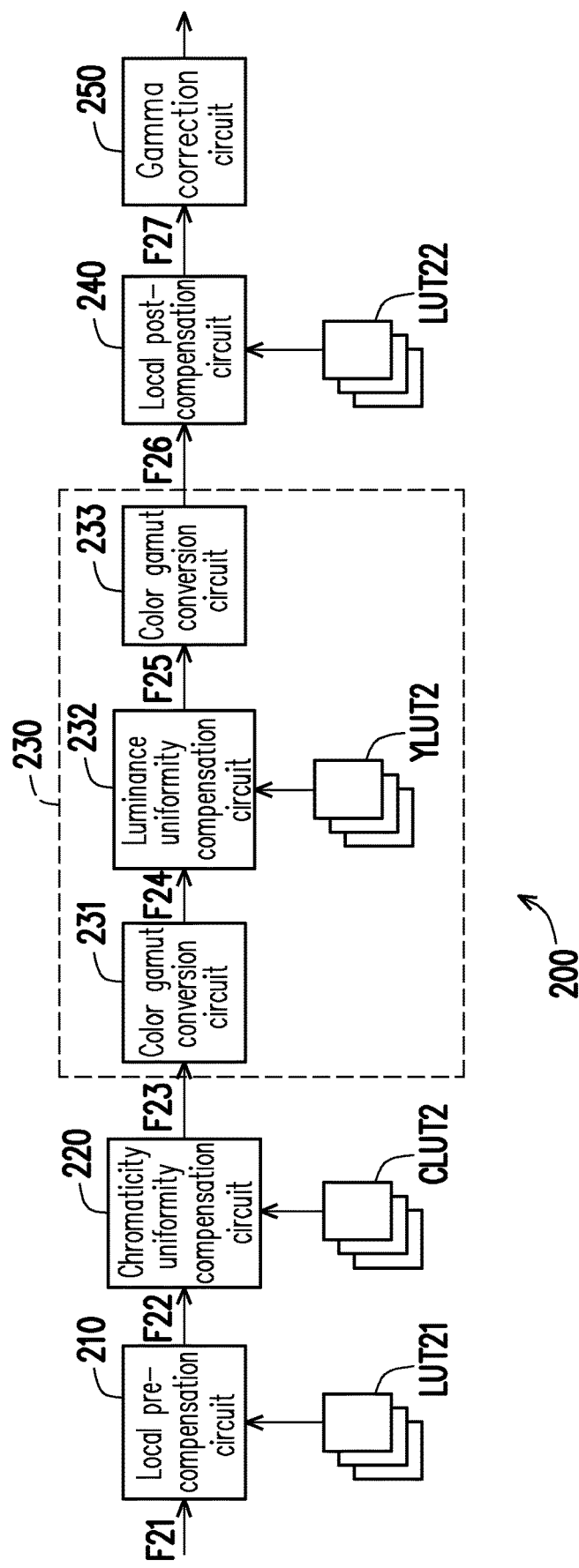
FIG. 2 is a schematic block diagram of a circuit block of an image uniformity compensation device according to another embodiment of the disclosure.

FIG. 2 is a schematic block diagram of a circuit block of an image uniformity compensation device 200 according to another embodiment of the disclosure. The image uniformity compensation device 200 includes a local pre-compensation circuit 210, a chromaticity uniformity compensation circuit 220, a luminance uniformity correction circuit 230, and a local post-compensation circuit 240. The local pre-compensation circuit 110 and the chromaticity uniformity compensation circuit 120 shown in FIG. 1 can be referred to for details of the local pre-compensation circuit 210 and the chromaticity uniformity compensation circuit 220 shown in FIG. 2. The pre-conversion lookup tables LUT11 and the chromaticity lookup tables CLUT1 shown in FIG. 1 can be referred to for details of pre-conversion lookup tables LUT21 and chromaticity lookup tables CLUT2 shown in FIG. 2. The original image frame F11, the converted frame F12, and the compensated frame F13 shown in FIG. 1 can be referred to for details of an original image frame F21, a converted frame F22, and a compensated frame F23 shown in FIG. 2. Therefore, descriptions regarding the above will not be repeated herein.

An input terminal of the luminance uniformity correction circuit 230 is coupled to an output terminal of the chromaticity uniformity compensation circuit 220 to receive the compensated frame F23. The luminance uniformity correction circuit 230 may perform a luminance uniformity correction on the compensated frame F23 to generate a corrected frame F26. The luminance uniformity correction circuit 140 and the corrected frame F17 shown in FIG. 1 can be referred to for details of the luminance uniformity correction circuit 230 and the corrected frame F26 shown in FIG. 2. For example, the luminance uniformity correction circuit 230 may perform the first color space conversion on the compensated frame F23 to generate a converted frame F24, and the luminance uniformity correction circuit 230 may perform the luminance uniformity compensation on the converted frame F24 to generate a compensated frame F25, and the luminance uniformity correction circuit 230 may perform the second color space conversion on the compensated frame F25 to generate the corrected frame F26.

The luminance uniformity correction circuit 230 shown in FIG. 2 may include a color space conversion circuit 231, a luminance uniformity compensation circuit 232, and a color space conversion circuit 233. The color space conversion compensation circuit 141, the luminance uniformity device 142, and the color space conversion circuit 143 shown in FIG. 1 can be referred to for details of the color space conversion circuit 231, the luminance uniformity compensation circuit 232, and the color space conversion circuit 233 shown in FIG. 2. The luminance lookup tables YLUT1 shown in FIG. 1 can be referred to for details of luminance lookup tables YLUT2 shown in FIG. 2. The converted frame F15, the compensated frame F16, and the corrected frame F17 shown in FIG. 1 can be referred to for details of the converted frame F24, the compensated frame F25, and the corrected frame F26 shown in FIG. 2. Therefore, descriptions regarding the above will not be repeated herein.

An input terminal of the local post-compensation circuit 240 is coupled to an output terminal of the luminance uniformity correction circuit 230 to receive the corrected frame F26. The local post-compensation circuit 240 may perform a local post-conversion on the corrected frame F26 to generate a converted frame F27 to be provided to a next level circuit (for example, a Gamma correction circuit 250 shown in FIG. 2 or other circuits). The local post-conversion includes the following. The corrected frame F26 is divided into multiple regions, and each of the regions of the corrected frame F26 is converted from an optical linear domain to an optical non-linear domain to generate a corresponding region in multiple regions of the converted frame F27. The local post-compensation circuit 130 shown in FIG. 1 can be referred to for details of the local post-compensation circuit 240 shown in FIG. 2. The post-conversion lookup tables LUT12 shown in FIG. 1 can be referred to for details of post-conversion lookup tables LUT22 shown in FIG. 2. The converted frame F14 shown in FIG. 1 can be referred to for details of the converted frame F27 shown in FIG. 2. Therefore, descriptions regarding the above will not be repeated herein. The local post-compensation circuit 240 may select a corresponding post-conversion lookup table corresponding to a current region in multiple regions of the corrected frame F26 from the post-conversion lookup tables LUT22, and the local post-compensation circuit 240 may convert the current region from the optical linear domain to the optical non-linear domain by using the corresponding post-conversion lookup table LUT22.

Figure 3:
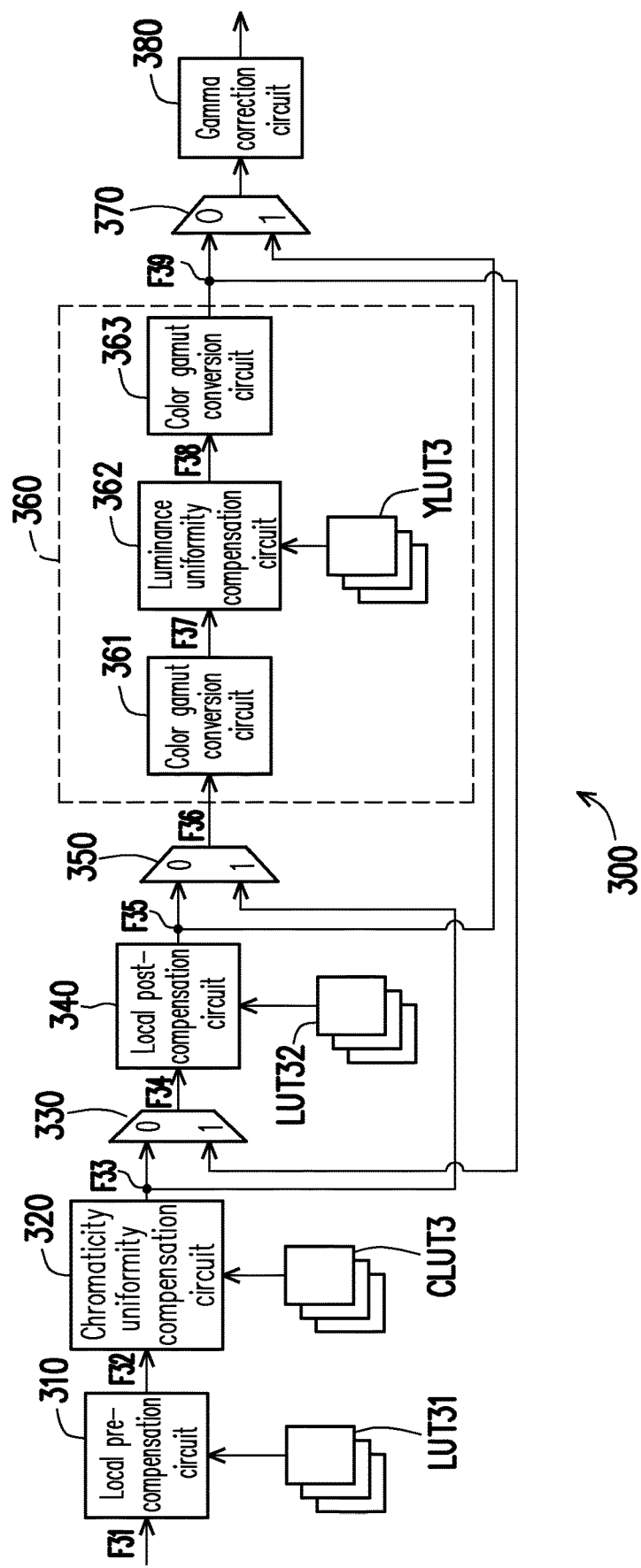
FIG. 3 is a schematic block diagram of a circuit block of an image uniformity compensation device according to yet another embodiment of the disclosure.

FIG. 3 is a schematic block diagram of a circuit block of an image uniformity compensation device 300 according to yet another embodiment of the disclosure. The image uniformity compensation device 300 includes a local pre-compensation circuit 310, a chromaticity uniformity compensation circuit 320, a multiplex circuit 330, a local post-compensation circuit 340, a multiplex circuit 350, a luminance uniformity correction circuit 360, and a multiplex circuit 370. The local pre-compensation circuit 110 and the chromaticity uniformity compensation circuit 120 shown in FIG. 1 can be referred to for details of the local pre-compensation circuit 310 and the chromaticity uniformity compensation circuit 320 shown in FIG. 3. The pre-conversion lookup tables LUT11 and the chromaticity lookup tables CLUT1 shown in FIG. 1 can be referred to for details of pre-conversion lookup tables LUT31 and chromaticity lookup tables CLUT3 shown in FIG. 3. The original image frame F11, the converted frame F12, and the compensated frame F13 shown in FIG. 1 can be referred to for details of an original image frame F31, a converted frame F32, and a compensated frame F33 shown in FIG. 3. Therefore, descriptions regarding the above will not be repeated herein.

A first input terminal of the multiplex circuit 330 is coupled to an output terminal of the chromaticity uniformity compensation circuit 320 to receive the compensated frame F33. An input terminal of the local post-compensation circuit 340 is coupled to an output terminal of the multiplex circuit 330 to receive an output frame F34. The local post-compensation circuit 340 may perform a local post-conversion on the output frame F34 of the multiplex circuit 330 to generate a converted frame F35. The local post-compensation circuit 130 shown in FIG. 1 can be referred to for details of the local post-compensation circuit 340 shown in FIG. 3. The post-conversion lookup tables LUT12 shown in FIG. 1 can be referred to for details of post-conversion lookup tables LUT32 shown in FIG. 3. The compensated frame F13 and the converted frame F14 shown in FIG. 1 can be referred to for details of the output frame F34 and the converted frame F35 shown in FIG. 3. Therefore, descriptions regarding the above will not be repeated herein. The local post-compensation circuit 340 may select a corresponding post-conversion lookup table corresponding to a current region in multiple regions of the output frame F34 from the post-conversion lookup tables LUT32, and the local post-compensation circuit 340 may convert the current region from an optical linear domain to an optical non-linear domain by using the corresponding post-conversion lookup table.

A first input terminal of the multiplex circuit 350 is coupled to an output terminal of the local post-compensation circuit 340 to receive the converted frame F35. A second input terminal of the multiplex circuit 350 is coupled to the output terminal of the chromaticity uniformity compensation circuit 320 to receive the compensated frame F33. An input terminal of the luminance uniformity correction circuit 360 is coupled to an output terminal of the multiplex circuit 350 to receive an output frame F36. The luminance uniformity correction circuit 360 may perform a luminance uniformity correction on the output frame F36 to generate a corrected frame F39. The luminance uniformity correction circuit 140 and the corrected frame F17 shown in FIG. 1 can be referred to for details of the luminance uniformity correction circuit 360 and the corrected frame F39 shown in FIG. 3. For example, the luminance uniformity correction circuit 360 may perform the first color space conversion on the output frame F36 to generate a converted frame F37, and the luminance uniformity correction circuit 360 may perform the luminance uniformity compensation on the converted frame F37 to generate a compensated frame F38, and the luminance uniformity correction circuit 360 may perform the second color space conversion on the compensated frame F38 to generate the corrected frame F39.

The luminance uniformity correction circuit 360 shown in FIG. 3 may include a color space conversion circuit 361, a luminance uniformity compensation circuit 362, and a color space conversion circuit 363. The color space conversion compensation circuit 141, the luminance uniformity device 142, and the color space conversion circuit 143 shown in FIG. 1 can be referred to for details of the color space conversion circuit 361, the luminance uniformity compensation circuit 362, and the color space conversion circuit 363 shown in FIG. 3. The luminance lookup tables YLUT1 shown in FIG. 1 can be referred to for details of luminance lookup tables YLUT3 shown in FIG. 3. The converted frame F15, the compensated frame F16, and the corrected frame F17 shown in FIG. 1 can be referred to for details of the converted frame F37, the compensated frame F38, and the corrected frame F39 shown in FIG. 3. Therefore, descriptions regarding the above will not be repeated herein.

A first input terminal of the multiplex circuit 370 and a second input terminal of the multiplex circuit 330 are coupled to an output terminal of luminance uniformity correction circuit 360 to receive the corrected frame F39. A second input terminal of the multiplex circuit 370 is coupled to the output terminal of the local post-compensation circuit 340 to receive the converted frame F35. An output terminal of the multiplex circuit 370 is coupled to a next circuit (for example, a Gamma correction circuit 380 shown in FIG. 3 or other circuits).

When the image uniformity compensation device 300 operates in a first mode, the multiplex circuit 330 optionally couples the output terminal of the chromaticity uniformity compensation circuit 320 to the input terminal of the local post-compensation circuit 340, the multiplex circuit 350 optionally couples the output terminal of the local post-compensation circuit 340 to the input terminal of the luminance uniformity correction circuit 360, and the multiplex circuit 370 optionally couples the output terminal of the luminance uniformity correction circuit 360 to the output terminal of the multiplex circuit 370. In the first mode, a circuit structure of the image uniformity compensation device 300 is similar to that of the image uniformity compensation device 100 shown in FIG. 1. Therefore, the image uniformity compensation device 100 shown in FIG. 1 can be referred to for details of the operation of the image uniformity compensation device 300 in the first mode. Therefore, descriptions regarding the above will not be repeated herein.

When the image uniformity compensation device 300 operates in a second mode, the multiplex circuit 330 optionally couples the output terminal of the luminance uniformity correction circuit 360 to the input terminal of the local post-compensation circuit 340, the multiplex circuit 350 optionally couples the output terminal of the chromaticity uniformity compensation circuit 320 to the input terminal of the luminance uniformity correction circuit 360, and the multiplex circuit 370 optionally couples the output terminal of the local post-compensation circuit 340 to the output terminal of the multiplex circuit 370. In the second mode, the circuit structure of the image uniformity compensation device 300 is similar to that of the image uniformity compensation device 200 shown in FIG. 2. Therefore, the image uniformity compensation device 200 shown in FIG. 2 can be referred to for details of the operation of the image uniformity compensation device 300 in the second mode. Therefore, descriptions regarding the above will not be repeated herein.

In summary, the image uniformity compensation device according to the above embodiments may convert a data domain of chromaticity uniformity processing (algorithm) of a chromaticity uniformity compensation circuit to a more accurate optical linear domain (for example, a linear RGB domain) through converting and correcting the local pre-compensation circuit and the local post-compensation circuit Therefore, the chromaticity uniformity processing of the chromaticity uniformity compensation circuit may achieve a more accurate chromaticity uniformity correction to improve image uniformity.

According to different design needs, the local pre-compensation circuit, the chromaticity uniformity compensation circuit, the local post-compensation circuit, the luminance uniformity correction circuit, the color space conversion circuit, and/or the luminance uniformity compensation circuit as described above may be implemented as hardware, firmware, software (that is, a program), or a combination of more than one of the above three).

In terms of hardware, the local pre-compensation circuit, chromaticity uniformity compensation circuit, the local post-compensation circuit, the luminance uniformity correction circuit, the color space conversion circuit, and/or the luminance uniformity compensation circuit as described above may be implemented as a logic circuit on an integrated circuit. The local pre-compensation circuit, the chromaticity uniformity compensation circuit, the local post-compensation circuit, the luminance uniformity correction circuit, the color space conversion circuit, and/or the related functions of the luminance uniformity compensation circuit as described above may be implemented as hardware by using hardware description languages (for example, Verilog HDL or VHDL) or other suitable programming languages. for example, the local pre-compensation circuit, the chromaticity uniformity compensation circuit, the local post-compensation circuit, the luminance uniformity correction circuit, the color space conversion circuit, and/or the related functions of the luminance uniformity compensation circuit as described above may be implemented as one or more controllers, microcontrollers, microprocessors, application-specific integrated circuits (ASICs), digital signal processors (DSPs), field programmable gate arrays (FPGAs), and/or various logic blocks, modules, and circuits in other processing units.

In terms of software and/or firmware, the local pre-compensation circuit, the chromaticity uniformity compensation circuit, the local post-compensation circuit, the luminance uniformity correction circuit, the color space conversion circuit, and/or the related functions of the luminance uniformity compensation circuit as described above may be implemented as programming codes. For example, the local pre-compensation circuit, the chromaticity uniformity compensation circuit, the local post-compensation circuit, the luminance uniformity correction circuit, the color space conversion circuit, and/or the luminance uniformity compensation circuit as described above may be realized by using general programming languages (for example, C, C++, or an assembly language) or other suitable programming languages. The programming codes may be recorded/stored in a "non-transitory computer readable medium," for example, a read only memory (ROM) and/or a storage device. The storage device may be a hard disk drive (HDD), a solid-state drive (SSD), or other storage devices. A central processing unit (CPU), a controller, a microcontroller or a microprocessor may read and execute the programming codes from the recording medium, thereby realizing the local pre-compensation circuit, the chromaticity uniformity compensation circuit, the local post-compensation circuit, the luminance uniformity correction circuit, the color space conversion circuit, and/or the related functions of the luminance uniformity compensation circuit as described above.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the scope of protection of the disclosure is defined by the scope of the appended claims.

What is claimed is:

1. An image uniformity compensation device, comprising:
    a local pre-compensation circuit, configured to perform a local pre-conversion on an original image frame to generate a first converted frame, wherein the local pre-conversion comprises: dividing the original image frame into a plurality of regions, and converting each of the regions of the original image frame from an optical non-linear domain to an optical linear domain to generate a corresponding region in a plurality of regions of the first converted frame;

a chromaticity uniformity compensation circuit comprises an input terminal coupled to an output terminal of the local pre-compensation circuit to receive the first converted frame, wherein the chromaticity uniformity compensation circuit is configured to perform a chromaticity uniformity compensation on the first converted frame to generate a first compensated frame;

a local post-compensation circuit comprises an input terminal coupled to an output terminal of the chromaticity uniformity compensation circuit to receive the first compensated frame, wherein the local post-compensation circuit is configured to perform a local post-conversion on the first compensated frame to generate a second converted frame, wherein the local post-conversion comprises: dividing the first compensated frame into a plurality of regions, and converting each of the regions of the first compensated frame from the optical linear domain to the optical non-linear domain to generate a corresponding region in a plurality of regions of the second converted frame; and a luminance uniformity correction circuit comprises an input terminal coupled to an output terminal of the local post-compensation circuit to receive the second converted frame, wherein the luminance uniformity correction circuit is configured to perform a luminance uniformity correction on the second converted frame to generate a corrected frame.

2. The image uniformity compensation device according to claim 1, wherein the local pre-compensation circuit comprises a plurality of pre-conversion lookup tables, the local pre-compensation circuit selects a corresponding pre-conversion lookup table corresponding to a current region in the regions of the original image frame from the pre-conversion lookup tables, and the local pre-compensation circuit converts the current region from the optical non-linear domain to the optical linear domain by using the corresponding pre-conversion lookup table.

3. The image uniformity compensation device according to claim 1, wherein the chromaticity uniformity compensation circuit compensates for a chromaticity uniformity of the first converted frame to generate the first compensated frame by using at least one chromaticity lookup table.

4. The image uniformity compensation device according to claim 1, wherein the local post-compensation circuit comprises a plurality of post-conversion lookup tables, the local post-compensation circuit selects a corresponding post-conversion lookup table corresponding to a current region in the regions of the first compensated frame from the post-conversion lookup tables, and the local post-compensation circuit converts the current region from the optical linear domain to the optical non-linear domain by using the corresponding post-conversion lookup table.

5. The image uniformity compensation device according to claim 1, wherein the luminance uniformity correction comprises: performing a first color space conversion on the second converted frame to generate a third converted frame, performing a luminance uniformity compensation on the third converted frame to generate a second compensated frame, and performing a second color space conversion on the second compensated frame to generate the corrected frame.

6. The image uniformity compensation device according to claim 1, wherein the luminance uniformity correction circuit performs a luminance uniformity compensation to generate the corrected frame by using at least one luminance lookup table.

7. The image uniformity compensation device according to claim 1, wherein the luminance uniformity correction circuit comprises:
a first color space conversion circuit comprises an input terminal coupled to the input terminal of the luminance uniformity correction circuit to receive the second converted frame, wherein the first color space conversion circuit is configured to perform a first color space conversion on the second converted frame to generate a third converted frame;

a luminance uniformity compensation circuit comprises an input terminal coupled to an output terminal of the first color space conversion circuit to receive the third converted frame, wherein the luminance uniformity compensation circuit is configured to perform a luminance uniformity compensation on the third converted frame to generate a second compensated frame; and a second color space conversion circuit comprises an input terminal coupled to an output terminal of the luminance uniformity compensation circuit to receive the second compensated frame, wherein the second color space conversion circuit is configured to perform a second color space conversion on the second compensated frame to generate the corrected frame.

8. The image uniformity compensation device according to claim 7, wherein the second converted frame and the corrected frame belong to a first color space, and the third converted frame belongs to a second color space.

9. The image uniformity compensation device according to claim 7, wherein the luminance uniformity compensation circuit corrects a luminance uniformity of the third converted frame to generate the second compensated frame by using at least one luminance lookup table.

10. An image uniformity compensation device, comprising:
a local pre-compensation circuit configured to perform a local pre-conversion on an original image frame to generate a first converted frame, wherein the local pre-conversion comprises: dividing the original image frame into a plurality of regions, and converting each of the regions of the original image frame from an optical non-linear domain to an optical linear domain to generate a corresponding region in a plurality of regions of the first converted frame;

a chromaticity uniformity compensation circuit comprises an input terminal coupled to an output terminal of the local pre-compensation circuit to receive the first converted frame, wherein the chromaticity uniformity compensation circuit is configured to perform a chromaticity uniformity compensation on the first converted frame to generate a first compensated frame;

a luminance uniformity correction circuit comprises an input terminal coupled to an output terminal of the chromaticity uniformity compensation circuit to receive the first compensated frame, wherein the luminance uniformity correction circuit is configured to perform a luminance uniformity correction on the first compensated frame to generate a corrected frame; and a local post-compensation circuit comprises an input terminal coupled to an output terminal of the luminance uniformity correction circuit to receive the corrected frame, wherein the local post-compensation circuit is configured to perform a local post-conversion on the corrected frame to generate a second converted frame, and wherein the local post-conversion comprises:
dividing the corrected frame into a plurality of regions, and converting each of the regions of the corrected frame from the optical linear domain to the optical non-linear domain to generate a corresponding region in a plurality of regions of the second converted frame.

11. The image uniformity compensation device according to claim 10, wherein the local pre-compensation circuit comprises a plurality of pre-conversion lookup tables, the local pre-compensation circuit selects a corresponding pre-conversion lookup table corresponding to a current region in the regions of the original image frame from the pre-conversion lookup tables, and the local pre-compensation circuit converts the current region from the optical non-linear domain to the optical linear domain by using the corresponding pre-conversion lookup table.

12. The image uniformity compensation device according to claim 10, wherein the chromaticity uniformity compensation circuit compensates for a chromaticity uniformity of the first converted frame to generate the first compensated frame by using at least one chromaticity lookup table.

13. The image uniformity compensation device according to claim 10, wherein the local post-compensation circuit comprises a plurality of post-conversion lookup tables, the local post-compensation circuit selects a corresponding post-conversion lookup table corresponding to a current region in the regions of the corrected frame from the post-conversion lookup tables, and the local post-compensation circuit converts the current region from the optical linear domain to the optical non-linear domain by using the corresponding post-conversion lookup table.

14. The image uniformity compensation device according to claim 10, wherein the luminance uniformity correction circuit comprises:
performing a first color space conversion on the first compensated frame to generate a third converted frame;
performing a luminance uniformity compensation on the third converted frame to generate a second compensated frame; and
performing a second color space conversion on the second compensated frame to generate the corrected frame.

15. The image uniformity compensation device according to claim 10, wherein the luminance uniformity correction circuit performs a luminance uniformity compensation to generate the corrected frame by using at least one luminance lookup table.

16. The image uniformity compensation device according to claim 10, wherein the luminance uniformity correction circuit comprises:
a first color space conversion circuit comprises an input terminal coupled to the input terminal of the luminance uniformity correction circuit to receive the first compensated frame, wherein the first color space conversion circuit is configured to perform a first color space conversion on the first compensated frame to generate a third converted frame;
a luminance uniformity compensation circuit comprises an input terminal coupled to an output terminal of the first color space conversion circuit to receive the third converted frame, wherein the luminance uniformity compensation circuit is configured to perform a luminance uniformity compensation on the third converted frame to generate a second compensated frame; and
a second color space conversion circuit comprises an input terminal coupled to an output terminal of the luminance uniformity compensation circuit to receive the second compensated frame, wherein the second color space conversion circuit is configured to perform a second color space conversion on the second compensated frame to generate the corrected frame.

17. The image uniformity compensation device according to claim 16, wherein the second converted frame and the corrected frame belong to a first color space, and the third converted frame belongs to a second color space.

18. The image uniformity compensation device according to claim 16, wherein the luminance uniformity compensation circuit corrects a luminance uniformity of the third converted frame to generate the second compensated frame by using at least one luminance lookup table.

19. An image uniformity compensation device, comprising:
a local pre-compensation circuit configured to perform a local pre-conversion on an original image frame to generate a first converted frame, wherein the local pre-conversion comprises:
dividing the original image frame into a plurality of regions, and converting each of the regions of the original image frame from an optical non-linear domain to an optical linear domain to generate a corresponding region in a plurality of regions of the first converted frame;
a chromaticity uniformity compensation circuit comprises an input terminal coupled to an output terminal of the local pre-compensation circuit to receive the first converted frame, wherein the chromaticity uniformity compensation circuit is configured to perform a chromaticity uniformity compensation on the first converted frame to generate a first compensated frame;
a first multiplex circuit comprises a first input terminal coupled to an output terminal of the chromaticity uniformity compensation circuit to receive the first compensated frame;
a local post-compensation circuit comprises an input terminal coupled to an output terminal of the first multiplex circuit to receive a first output frame, wherein the local post-compensation circuit is configured to perform a local post-conversion on the first output frame of the first multiplex circuit to generate a second converted frame, and wherein the local post-conversion comprises:
dividing the first output frame into a plurality of regions, and converting each of the regions of the first output frame from the optical linear domain to the optical non-linear domain to generate a corresponding region in a plurality of regions of the second converted frame;
a second multiplex circuit comprises a first input terminal coupled to an output terminal of the local post-compensation circuit to receive the second converted frame, wherein a second input terminal of the second multiplex circuit is coupled to the output terminal of the chromaticity uniformity compensation circuit to receive the first compensated frame;
a luminance uniformity correction circuit comprises an input terminal coupled to an output terminal of the second multiplex circuit to receive a second output frame, wherein the luminance uniformity correction circuit is configured to perform a luminance uniformity correction on the second output frame to generate a corrected frame, wherein an output terminal of the luminance uniformity correction circuit is coupled to a second input terminal of the first multiplex circuit; and
a third multiplex circuit comprises a first input terminal coupled to the output terminal of the luminance uniformity correction circuit to receive the corrected frame, wherein a second input terminal of the third multiplex circuit is coupled to the output terminal of the local post-compensation circuit to receive the second converted frame.

20. The image uniformity compensation device according to claim 19, wherein the local pre-compensation circuit comprises a plurality of pre-conversion lookup tables, the local pre-compensation circuit selects a corresponding pre-conversion lookup table corresponding to a current region in the regions of the original image frame from the pre-conversion lookup tables, and the local pre-compensation circuit converts the current region from the optical non-linear domain to the optical linear domain by using the corresponding pre-conversion lookup table.

21. The image uniformity compensation device according to claim 19, wherein the chromaticity uniformity compensation circuit compensates for a chromaticity uniformity of the first converted frame to generate the first compensated frame by using at least one chromaticity lookup table.

22. The image uniformity compensation device according to claim 19, wherein the local post-compensation circuit comprises a plurality of post-conversion lookup tables, the local post-compensation circuit selects a corresponding post-conversion lookup table corresponding to a current region in the regions of the first output frame from the post-conversion lookup tables, and the local post-compensation circuit converts the current region from the optical linear domain to the optical non-linear domain by using the corresponding post-conversion lookup table.

23. The image uniformity compensation device according to claim 19, wherein the luminance uniformity correction circuit comprises:
performing a first color space conversion on the second output frame to generate a third converted frame;
performing a luminance uniformity compensation on the third converted frame to generate a second compensated frame; and
performing a second color space conversion on the second compensated frame to generate the corrected frame.

24. The image uniformity compensation device according to claim 19, wherein the luminance uniformity correction circuit performs a luminance uniformity compensation to generate the corrected frame by using at least one luminance lookup table.

25. The image uniformity compensation device according to claim 19, wherein the luminance uniformity correction circuit comprises:
a first color space conversion circuit comprises an input terminal coupled to the input terminal of the luminance uniformity correction circuit to receive the second output frame, wherein the first color space conversion circuit is configured to perform a first color space conversion on the second output frame to generate a third converted frame;
a luminance uniformity compensation circuit comprises an input terminal coupled to an output terminal of the first color space conversion circuit to receive the third converted frame, wherein the luminance uniformity compensation circuit is configured to perform a luminance uniformity compensation on the third converted frame to generate a second compensated frame; and
a second color space conversion circuit comprises an input terminal coupled to an output terminal of the luminance uniformity compensation circuit to receive the second compensated frame, wherein the second color space conversion circuit is configured to perform a second color space conversion on the second compensated frame to generate the corrected frame.

26. The image uniformity compensation device according to claim 25, wherein the second output frame and the corrected frame belong to a first color space, and the third converted frame belongs to a second color space.

27. The image uniformity compensation device according to claim 25, wherein the luminance uniformity compensation circuit corrects a luminance uniformity of the third converted frame to generate the second compensated frame by using at least one luminance lookup table.

28. The image uniformity compensation device according to claim 19, wherein:
when the image uniformity compensation device operates in a first mode, the first multiplex circuit optionally couples the output terminal of the chromaticity uniformity compensation circuit to the input terminal of the local post-compensation circuit, the second multiplex circuit optionally couples the output terminal of the local post-compensation circuit to the input terminal of the luminance uniformity correction circuit, and the third multiplex circuit optionally couples the output terminal of the luminance uniformity correction circuit to an output terminal of the third multiplex circuit; and
when the image uniformity compensation device operates in a second mode, the first multiplex circuit optionally couples the output terminal of the luminance uniformity correction circuit to the input terminal of the local post-compensation circuit, the second multiplex circuit optionally couples the output terminal of the chromaticity uniformity compensation circuit to the input terminal of the luminance uniformity correction circuit, and the third multiplex circuit optionally couples the output terminal of the local post-compensation circuit to the output terminal of the third multiplex circuit.

* * * * *